United States Patent [19]
Hutzel et al.

[11] Patent Number: 5,547,285
[45] Date of Patent: Aug. 20, 1996

[54] LINEAR GUIDE MEANS

[75] Inventors: Bernhard Hutzel, Neunkirchen; Günter Blaurock, Niederwerrn; Michael Klein, Grafenrheinfeld, all of Germany

[73] Assignee: Deutsche Star GmbH, Schweinfurt, Germany

[21] Appl. No.: 227,738

[22] Filed: Apr. 14, 1994

[30] Foreign Application Priority Data

Apr. 16, 1993 [DE] Germany .......................... 43 12 470.4
Feb. 9, 1994 [DE] Germany .......................... 44 04 109.8

[51] Int. Cl.$^6$ ...................................................... F10C 29/06
[52] U.S. Cl. .............................................. 384/15; 384/45
[58] Field of Search .................................. 384/15, 43–45

[56] References Cited

U.S. PATENT DOCUMENTS

| | | | |
|---|---|---|---|
| 3,515,444 | 6/1970 | Grabner | 384/15 |
| 3,890,021 | 6/1975 | Smith et al. | |
| 4,886,376 | 12/1989 | Osawa | 384/15 |
| 4,963,038 | 10/1990 | Asano et al. | 384/45 X |
| 5,186,544 | 2/1993 | Eder et al. | 384/15 |
| 5,201,386 | 4/1993 | Lederman | 184/64 |

FOREIGN PATENT DOCUMENTS

| | | |
|---|---|---|
| 2142463 | 1/1973 | France . |
| 9317161 | 1/1994 | Germany . |
| 9312351 | 6/1993 | WIPO . |

OTHER PUBLICATIONS

DE–Buch O. Richter, R. v. Voss, Bauelemente der Feinmechanik, 8. Aufl. VEB Verlag Technik Berlin, 1959, S. 252 bis 255, Kap. 36 "Prismenschubführungen".

DE–Katalogblatt Busak+Luyken, Dichtungen, Lieferprogramm, 1990.

Primary Examiner—Thomas R. Hannon
Attorney, Agent, or Firm—Brumbaugh, Graves, Donohue & Raymond

[57] ABSTRACT

A guide carriage 12 is guided on a guide rail 10 by rollers 12a. The rollers 12a engage guideways 10c. For lubricating the guideways 10c there are mounted on the end faces of the guide carriage 12 plate-shaped housings 14. Constructed in these plate-shaped housings are guides 24 for lubricating element fittings 26. The lubricating element fittings accommodate track lubricating elements 34 of felt. The lubricating element fittings 26 are pressed against the guideways 10c by pre-tensioning springs 42. The track lubricating elements 34 are captively accommodated in the lubricating element fittings 26. The lubricating element fittings 26 are captively guided in the guides 24. The track lubricating elements 24 are in a lubricant conductive connection with lubricant supply chambers 40 within the plate-shaped housing 14.

74 Claims, 7 Drawing Sheets

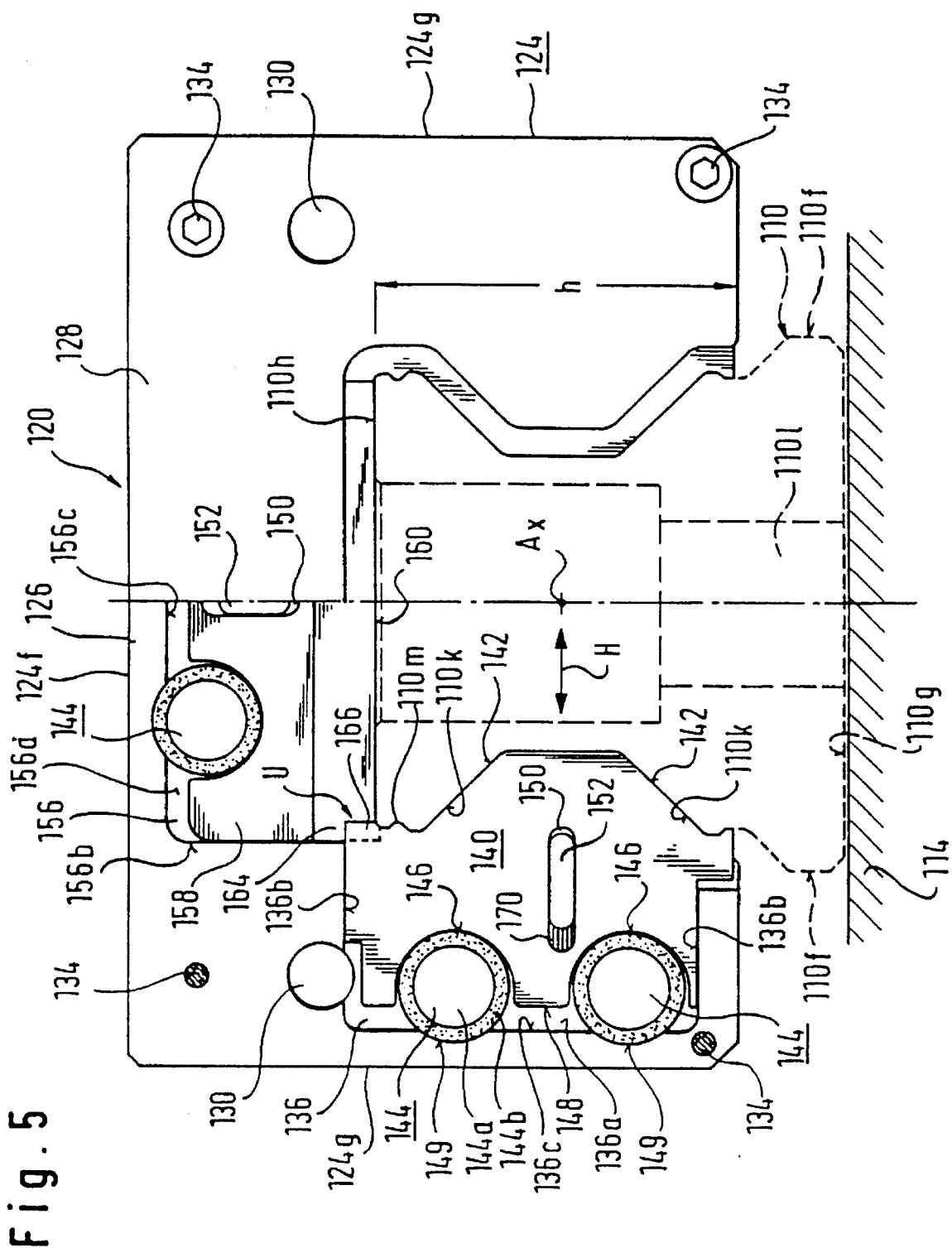

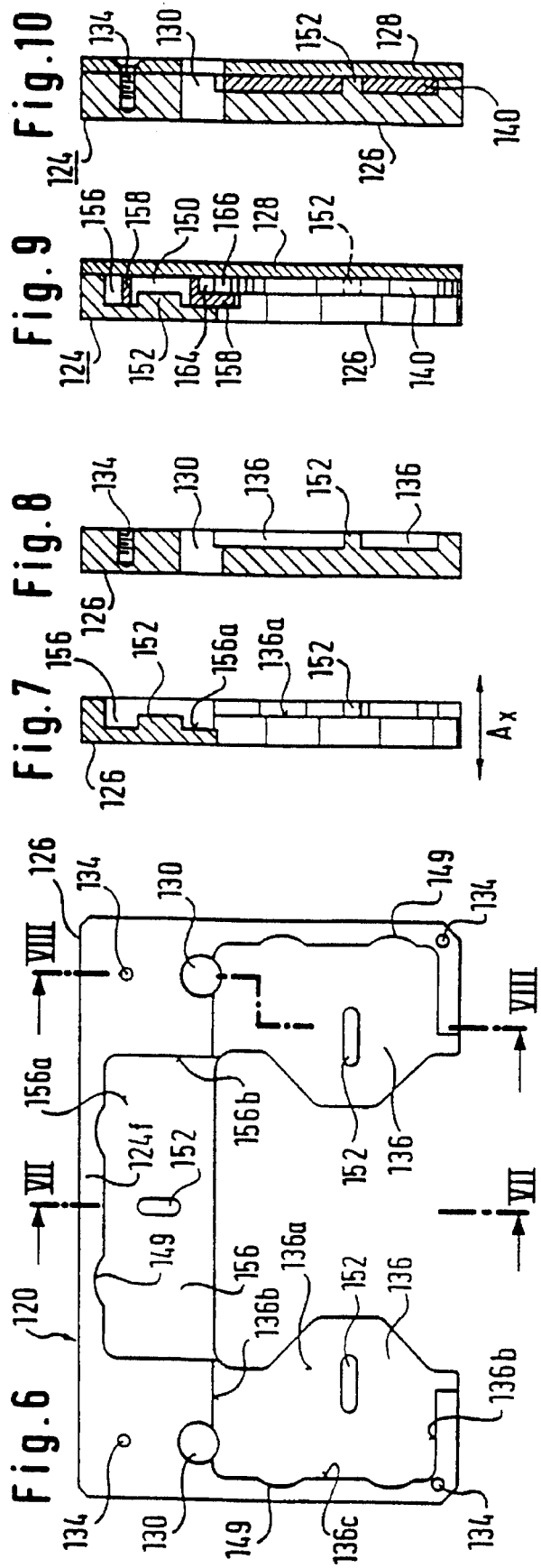

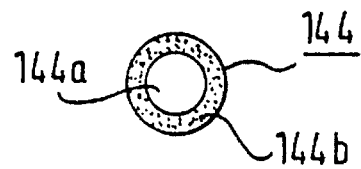
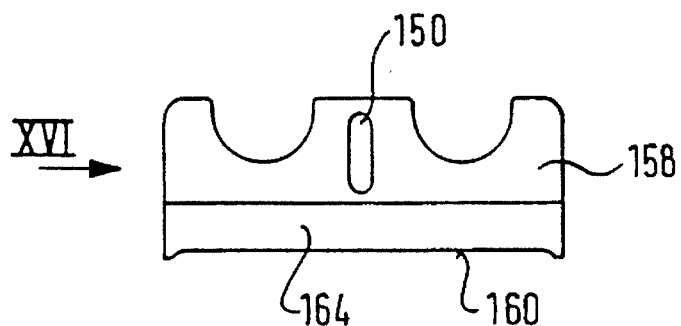
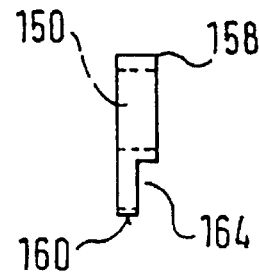
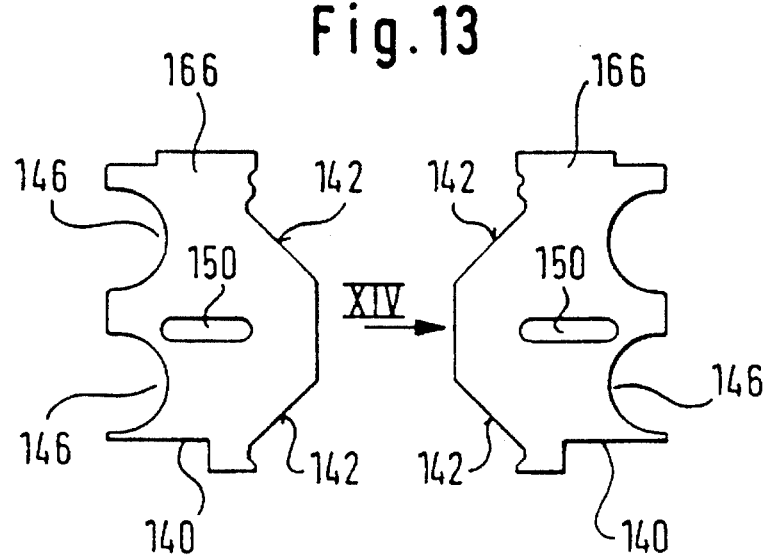
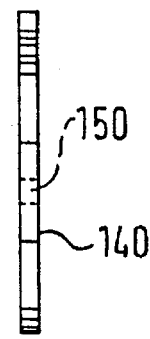

5,547,285

LINEAR GUIDE MEANS

BACKGROUND OF THE INVENTION

The invention relates to linear guide means comprising a guide rail with an axis and at least one track and at least one guide carriage with at least one guide element which, in the operating condition, is guided on said track, a lubricating element carrier for a track lubricating element being mounted on the guide carriage, said track lubricating element consisting of a material capable of moulding to the track and distributing the lubricant, said track lubricating element inside the lubricating element carrier being pre-tensioned against the track in a direction subsrantially at right-angles to the axis and communicating with a supply of lubricant in the lubricating element carrier.

STATEMENT OF THE PRIOR ART

Such a linear guide means is known from a public prior use by Messrs. INA. Where the known arrangement is concerned, the lubricating element carrier carries the serial number ABG 32K-86041 and a guide element for the lubricating element which is immovably housed inside the lubricating element carrier is identified by the designation ABG 32K-86/1.

In the case of the prior art linear guide means, there is mounted on an end face of a guide carriage guided on the guide rail by means of rollers, said end face being at right-angles to the axis of the guide rail, a hollow plate the cavity in which bears against the end face of the guide carriage and has a contour which engages around the guide rail virtually in U-shape. In the arms of the consequently approximately U-shaped hollow plate are separable housing elements which together with the hollow plate form a chamber to hold a felt member. The accommodating chambers are immovably combined with the hollow plate. In each of the chambers there is a space for lubricant and this can be connected to a lubricant topping-up unit via a nipple in the hollow plate. The supply of lubricant is thus limited to the relatively small volume of these chambers. The chambers are independent of one another and can be filled by respectively separate lubricant connecting nipples. In addition, there are in the chambers coil thrust springs which apply an initial tension to the felt members through a respective chamber aperture and in the direction of the track. The felt bodies are stabilised in their operating position by bearing on the respective track so long as the guide carriage assumes its operating position on the guide rail and the respective hollow plate is rigidly connected to the guide carriage. If the guide carriage is removed from the guide rail in its axial direction or if the hollow plate with the respective chamber is separated from the guide carriage and is separately removed from the guide rail in the axial direction thereof, then the pre-tensioning spring can relax and push the respective felt body out of the respective chamber. Then the felt body may be lost. Furthermore, any lubricant which may still be present in the chamber can emerge in an uncontrolled fashion through the orifice which until then was closed by the felt body on a basis of the operating condition.

OBJECT OF THE INVENTION

The invention is based on the problem of so developing a linear guide means of the type mentioned at the outset that even with a removal of the lubricant element carrier from the guide carriage and/or upon removal of the guide carriage from the guide rail, the sub-assembly formed by the lubricant element carrier and the lubricating element remains as one unit.

SUMMARY OF THE INVENTION

The invention provides that the track lubricating element is captively housed in a lubricating element fitting and in that the lubricating element fitting is likewise captively housed in the lubricating element carrier and is guided for movement in a direction substantially at right-angles to the axis and pre-tensioned towards the track.

By reason of the captive assembly of the track lubricating element and the lubricating element carrier, treatment of the linear guide means is substantially simplified during assembly and dismantling. It is ensured that also during any reassembly of a linear guide means previously dismantled, for instance for repair or maintenance purposes, all elements of the lubricating device are present and in fact in a proper reciprocal relationship.

A further advantage of the development of a linear guide means according to the invention resides in the fact that due to the track lubricating element being guided in the lubricating element carrier by means of a lubricating element fitting, a clearly defined guiding friction of the track lubricating element respect of the lubricating element carrier is achieved regardless of the nature and in particular the surface properties of the track lubricating element. Thus it is also ensured that the applied pressure and thus the lubricant distribution of the track lubricating element over the respective track is always properly defined.

In the case of the prior art solution, whereas the lubricant stock is confined to the volume of a respective small chamber, in accordance with a further development of a solution according to the invention, the lubricant supply is accommodated outside the lubricating element fitting but within the lubricating element carrier and in that a lubricant connection exists between the lubricant supply and the track lubricating element housed inside the lubricating element fitting. This development is in itself independent of the captive securing of the lubricant element fitting inside the lubricant element carrier and should therefore enjoy independent protection.

Where this development is concerned, a large part of the cavity available inside the lubricant element carrier can be used to hold the supply of lubricant so that lubricant is available either for the entire expected working life or there is in any case sufficient lubricant that topping up with lubricant is necessary only at long intervals.

In accordance with a particularly favourable structural design of the idea underlying the invention, the lubricant element fitting has a fitting housing with a lateral surface substantially parallel with the guidance direction of the lubricating element fitting, said fitting housing having an end open towards the track, the track lubricating element projecting beyond this open end towards the track. In the case of this structural development, optimum guidance conditions are obtained for the lubricating element fitting inside the lubricating element carrier.

In consequence, the constant connection between a lubricant supply which is accommodated in a stationary fashion inside the lubricating element carrier and the track lubricating element can be established in that the fitting housing has at its end remote from the track an aperture which communicates with the lubricant supply.

The unintended emergence of lubricant to the guide rail and the environment can be prevented if the fitting housing extends through sealing means of the lubricating element carrier which bears substantially all round on the lateral surface.

The captive nature of the lubricating element fitting inside the lubricating element carrier can easily be achieved if the lubricating element fitting has an abutment which, in conjunction with a mating abutment on the lubricating element carrier, restricts the mobility of the lubricating element fitting towards the track. In this respect, it must also be mentioned in particular that both the lubricating element carrier and also the lubricating element fitting may be produced as injection mouldings, particularly from hard plastics material or light metal so that the abutments at both ends can easily be retained within the respective shaping. In particular, it is conceivable that if the lubricating element fitting is constructed with a fitting housing the abutment may be constituted by an outwardly projecting shoulder on the fitting housing at its end remote from the track.

With a simple design of components on the one hand, in order to be able easily to position the track lubricating element even at the assembly stage and in order on the other also to facilitate positioning of the pre-tensioning means, it is suggested that at a midway location on its length extending in the guidance direction, the fitting housing has a bracing member which serves on the one hand as an abutment for the track lubricating element which is introduced into the fitting housing from the end close to the track and, on the other, as an abutment for a pre-tensioning spring which is biased on the lubricating element carrier. If it is desired as pre-tensioning means to use a coil thrust spring, then it is possible for the bracing member to be constructed with a centring mandrel for this coil thrust spring.

In order to be able to obtain by simple design means and without any cutting-removing shaping processes the lubricating connection between the lubricant supply and the track lubricating element, it is suggested that the bracing member fill only a part of the cross-section of the fitting housing and leave apertures exposed for lubricant inside the fitting housing.

In order to ensure the captive nature of the track lubricating element in relation to the lubricating element fitting with the minimum of structural cost, it is proposed that the track lubricating element should be received within the lubricating element by friction fit. This development likewise ensures that there is no emergence of lubricant through the lubricating element fitting which is likely to exceed the lubricant needs of the guideway.

It is conceivable to provide the track lubricating element with special passages for the conducting of lubricant. However, preferably it will be envisaged that the track lubricating element be constituted by porous lubricant conductive material. In this case, the porosity will, according to the consistency of the lubricant, be so adjusted that an adequate supply of lubricant to the track is guaranteed as a result of permeation of the lubricant through the porous bodies. The dimensioning of the initial tension force of the spring can, by simple experiments, be so constructed that an optimum supply of lubricant to the track is always guaranteed.

Preferably, the material used for the respective track lubricating element is a material which is sufficiently form rigid so that under the pressure of the pre-tensioning means, it is able to retain its shape by and large whereby also the stabilising of the form must be taken into account by the lubricating element fitting which supports a major part of the track lubricating elements. On the other hand, it is preferable to choose a material which, having regard to the pre-tensioning forces to be applied, is sufficiently resilient that after a rough adaptation of profiles to the profile on the respective track, this latter can blend sufficiently evenly in the sense of a uniform supply of lubricant to the entire profile surface of the track. Taking into account the aforedescribed criteria, it is possible for producing the track lubricating element to use in particular a medium-rigid felt which is in itself already known per se from the abovementioned public prior use.

The sealing against unintended emergence of lubricant from the lubricant supply can be guaranteed in that the track lubricating element fills in substantially the entire cross-section of the lubricating element fitting which is constructed as a fitting housing.

On the question of sufficient supply of lubricant to the track on the one hand and suppression of excessive emergence of lubricant on the other the structure of the material used for the track lubricating element, particularly felt, is of vital importance and from this point of view it will be preferable to ensure that the track lubricating element is constructed with such a lubricant conducting capacity in respect of the viscosity of whatever lubricant is being used that substantially no lubricant is lost in a direction at right-angles to the direction of guidance of the track lubricating element.

As a rule, for unequivocal guidance of a guide carriage on a guide rail, a plurality of tracks are used and correspondingly, for engagement with these tracks, at least one guide element in each case. In the case of such a structure, in order to simplify manufacture and assembly of the lubricating means, it is envisaged that with the presence of a plurality of tracks on the guide rail, at least one track lubricating element is provided at one and the same lubricating element carrier in association with each of these tracks.

With a U-shaped design of the guide carriage and a straddling disposition of the U-shaped guide carriage on the guide rail, there is preferably such a relationship that on one and the same lubricating element carrier there may be two mutually opposite track lubricating elements whereby their lubricating element fittings have guidance directions which are substantially aligned with one another.

The fact should not be disregarded that the lubricating element carrier can be mounted at any desired location, particularly also in the region of the longitudinal centre between two successive guide elements associated with one and the same track. However, for reasons of manufacture and assembly, it is preferably envisaged that the lubricating element carrier should be constructed as a plate-like structure which is mounted on an end face of the guide carriage which is substantially at right-angles to the axis of the guide rail. Therefore, the size of the lubricating element carrier can automatically be adapted to the size of the guide tracks and the number of guide tracks, substantially in that, viewed in the axial direction of the guide rail—one imparts to the plate-like lubricating element carrier a peripheral contour of the guide carriage which is at least approximately corresponding to that of the guide carriage.

On occasion, there is a need to undertake at the end surfaces of the guide carriage the narrowest possible adaptation of contours to the profile of the guide rail in order to prevent chippings or other impurities penetrating between guide carriage and rails. This is particularly true if in keeping with a preferred example of application of the linear guide means according to the invention, this is used as workpiece carrier or tool carrier on machine tools, possibly cutting removing machine tools. Accordingly, it may be advantageous for the lubricating element carrier to have an inner peripheral contour which is approximately adapted to the outer cross-section of the guide rail on which it bears possibly through a gasket which follows the contours, whereby the at least one track lubricating element projects beyond the surrounding contour and towards the respective track. With such a design, then, the plate-shaped lubricating element carrier simultaneously serves as a scraping device which on the one hand prevents particles of dirt penetrating between guide carriage and guide rail and on the other limits the dispensing of lubricant to the tracks substantially to the respective axial length of the guide carriage.

The possibility of increasing the lubricant supply space which exists according to the invention makes it possible for a lifetime filling of lubricant to be contained within the lubricating element carrier.

However, it ought not to be excluded either that the lubricant supply is constructed with a lubricant connection for a lubricant topping up unit, the connection preferably taking the form of a lubricating nipple with a non-return action. In this case, the time lapse between successive lubricating agent topping up processes may be quite extensive.

Whereas in accordance with the state of the art individual track lubricating elements are in each case connected to one individually associated supply of lubricant, the invention provides the opportunity which is therefore preferably utilised so that when a plurality of track lubricating elements are disposed on a common lubricating element carrier, these latter communicate with one common supply of lubricant. Also this known new thought should enjoy independent protection regardless of the use of the lubricant element fitting.

In order as far as possible not to alter or to produce the least possible enlargement of the form of guide carriage chosen on grounds of production and usage, by the attachment of the track lubricating arrangement, it is envisaged to construct the sealing element carrier as a flat housing which is possibly separably fixed as a separate component of the guide carriage on at least one end face of the guide carriage which is substantially at right-angles to the axial direction of the guide rail; here again, the idea particularly is to have equality of contours when looking in the axial direction of the guide rail.

In order to use extremely simple production methods and yet provide inside the flat housing the guide means and largest possible spaces to accommodate the lubricant supply, it is thought that the flat housing should be constructed from two flat housing parts which bear on each other like a sandwich.

Taking into account the moulding and injection moulding methods which are considered particularly for production entailing synthetic plastics and light metal or even zinc, it is further proposed, by way of adaptation to the possibilities of these shaping methods, that the flat housing parts consist in each case of a main wall and ribs extending at right-angles thereto and, in the assembled state, should in principle be constructed in a mirror-symmetrical relationship in respect of a common central plane parallel with the main walls. The ribs at the edge can then define the outward seal and the inner ribs can define lubricant storage spaces in favourable proximity to the track lubricating elements. Further ribs may form lubricant supply passages which extend either to the track lubricating elements or to connections for topping up with lubricant.

For cost saving reasons in terms of shapes, when the parts are produced and stored, it is suggested that the flat housing parts be of identical construction.

If the flat housing parts are of identical manufacture, difficulties in sealing and in establishing the engagement between these identically produced parts can be avoided in that in the assembled state of the flat housing sealing and/or fixing means associated with the head surfaces of ribs which rest on one another are only disposed over half the area of the flat housing parts so that in the assembled state they are distributed over the entire area of contact between the flat housing parts and complement one another. If according to is principle the parts are produced from synthetic plastics material, then these parts can be assembled together in sealing-tight manner extremely easily, possibly by welding, adhesion or by a snap-fitting interlocking of inter-engaging connecting elements. For sealing-tight reasons, ultrasonic welding is particularly preferred.

Independently of the special design of the lubricating element carrier, it is generally suggested that the lubricating element carrier be constructed as a housing which outwardly tightly seals the supply of lubricant and the lubricant conducting paths, said housing to have a lubricant outlet only in the region of the at least one track lubricating element. In this respect, it should be noted that then, in contrast to the state of the art, where the cavity is formed between a hollow plate and an end face of the guide carriage, the closed cavity is still maintained if the lubricant carrier is as a whole remote from the guide carriage. Contamination of the surrounding area by lubricant when the lubricating element carrier is removed from the guide carriage is then impossible.

Naturally there must be provision for a filling point in the housing, regardless of whether a lifetime filling or renewable filling is applicable. Nevertheless, in order to prevent the unintended emergence of lubricant, the filling point can be constructed with a separable plug or a non-return nipple.

Alternatively, with the anticipated operating orientation of the linear guidance, it is conceivable that the filling point will be disposed at some location which, during operation, is situated above the lubricant supply and in this case it is possible in some instances to dispense with a connection for the filling point.

Since the housing will frequently be mounted on the guide carriage by means of apertures through which screws pass, it is further recommended that the housing parts be traversed by fixing apertures for mounting on the guide carriage, the housing parts also being sealed in respect of one another in the area surrounding these fixing apertures; in this way, it is possible to avoid lubricant emerging from the fixing apertures.

With regard to the sealing-tight passages through which the lubricating element fittings pass and which are mentioned hereinabove, it will also be necessary when designing the housing to bear in mind that there are on housing parts of the housing half housing chambers to accommodate in each case one half of a gasket which is traversed by the relevant lubricating element fitting.

The proposal underlying the invention can in principle also be applied in the case of linear guidance means in which the guide carriage is guided on the guide rail by rows of rotating roller bodies. In particular, the design according to the invention can be employed when at least one guide element consists of a guide roller. In this respect, reference is made particularly to those constructions in which the guide roller has a concave lateral surface which engages a matching profile forming the guideway. In particular, it is conceivable for the profile to be formed by a rod of approximately circular cross-section and which is fixed on a carrier rail. Again, it is also true here that the guide carriage engages around the guide rail approximately in a U-shaped manner and in particular that at least one guide roller is disposed on each of the two arms of the U-shaped guide carriage.

The thought of constructing the lubricating element carrier as a tightly sealed housing which is closed in itself, is to be protected independently of the disposition of the lubricating element fitting inside the lubricating element carrier.

Viewed from another angle, the invention relates to a guide unit comprising a guide rail with an axis and at least one track and at least one guide carriage with at least one guide element guided on this track in an operating condition, whereby there is on the guide carriage a treating element carrier for at least one rail treating element, particularly a track treating element, this rail treating element being guided on the treating element carrier by guide means and in a plane substantially at right-angles to the axis and being pre-tensioned against the guide rail.

For such a guide unit, it is suggested that the rail treating element be captive in the treating element carrier.

As a result of this measure, the rail treating element can be mounted on the guide carriage easily and in the correct position regardless of whether this guide carriage is already mounted on a guide rail or whether the guide carriage is still separate from the guide rail.

Therefore the rail treating element can be combined with the treating element carrier into a pre-assembled component and mounting or interchange of the rail treating element can be carried out easily, particularly if the linear guide means is disposed at some confined location inside a machine tool, an assembly machine, a measuring device or a robot.

Preferably, the rail treating element is guided within the treating element carrier by rectilinear guide means, in other words for example rectilinear guide rails. This ensures that the rail treating element engages the guide rail evenly over the entire length of the profiled part of the guide rail with which the treating element is supposed to cooperate.

Particularly in the case of rectilinear guidance, protection of the rail treating element from loss can be achieved by abutment means which, in conjunction with counter-abutting means on the treating element carrier, limit the mobility of the rail treating element which is allowed by the guide means so that the rail treating element is unable to fall out of the associated guide.

It is possible to provide on one and the same treating element carrier guide means for a plurality of rail treating elements. In this way, mounting of the rail treating elements on a guide carriage is even further facilitated. With a few simple movements, all the rail treating elements can be simultaneously mounted on or removed from the guide carriage without any prolonged interruption to working.

For example, it is possible to provide on one and the same treating element carrier two oppositely disposed rail treating elements, possibly when there are on a guide rail, on two remote side faces, respectively one or two or more tracks and when these tracks have to be subjected to a treatment, e.g. a treatment with a lubricant.

A particularly simple fixing of the treating element carrier on the guide carriage is possible if the treating element carrier is constructed with a substantially plane abutment face for mounting on an end face of the guide carriage which is substantially at right-angles to the axis of the guide carriage. It is then possible to provide fixing holes which extend substantially at right-angles to the bearing surface of the treating element carrier and to fix the treating element carrier on the end face of the guide carriage by means of fixing bolts, possibly screw-threaded bolts. The fixing bolts can provide simultaneously for positioning the treating element carrier on the guide carriage. However, it is also possible to provide separate positioning means on the guide carriage and the treating element carrier so that the treating element carrier and thus the rail treating elements can be fixed on the guide carriage in the correct position for rail treatment without any lengthy readjustment.

The treating element carrier can be constructed as a substantially plane-parallel flat member so that the length of the guide carriage in the axial direction is extended as little as possible in respect of the necessary guide length so that the available travel of the guide carriage along the guide rail remains as great as possible. In particular, the treating element carrier can be constructed as a housing, preferably as a flat housing, this housing containing the guide means for the at least one rail treating element. This provides for an attractive design of the guide carriage which is assembled together with the treating element carrier and the treating elements. This guide carriage is contact-friendly since the treating elements only protrude from the housing in so far as is absolutely necessary for treatment of the guide rail. The guide carriage with the attached treating elements can then be cleaned easily, as well.

For assembly and for covering the treating elements, it is particularly advantageous for the treating element carrier to be composed of two carrier parts which bear one against the other like a sandwich. The guide means for the rail treating elements can be disposed in the region of contacting surfaces of the carrier parts which bear on each other sandwich-fashion, particularly in such a way that the at least one rail treating element and advantageously also the pre-tensioning means associated with it can be held securely captive in the guide means of the one carrier part in that the contacting surfaces of the two carrier parts bear on each other and are fixed in respect of each other. The two carrier parts can be connected to each other thereby by welding, particularly ultrasonic welding, or by adhesion or by screwing or by interlocking.

In accordance with a design frequently used in the state of the art, the guide carriage can be substantially U-shaped (based on a direction of view in the longitudinal direction of the axis of the guide rail), in which case the guide carriage has a web portion situated close to a head surface of the guide rail, one flange portion being close to each lateral surface of the guide rail. There then remains exposed on the guide rail a base surface which is opposite the head surface and by which the guide rail can be mounted on a carrier, e.g. by screws disposed at intervals along the guide rail, traverse the guide over its entire height and are screwed into the carrier. With such an arrangement, the U-shaped guide carriage is frequently guided by respective systems of rolling means disposed between the two flange portions and the respectively associated lateral surface of the guide rail. The systems of rolling means can thereby be fixed on the guide carriage. For example, the rolling means systems may be constituted by, mounted singly on the guide carriage, rollers of which the peripheral surfaces are in rolling engagement with tracks on the guide rail. Similarly, it is possible for the systems of rolling means to be formed by endless rows of rolling bodies guided on the guide carriage. The rows of rolling bodies may consist thereby of balls such as are known for instance from DE-OS 36 20 571. The rows of rolling bodies can however also be constituted by rollers or needles. In the case of a guide carriage which is of U-shaped construction, it is possible to provide in each flange portion two or more endless rows of rolling bodies as known for instance from DE-OS 36 20 571.

As already indicated hereinabove, the rail treating element may be a porous body which applies lubricant to tracks. Such a lubricant applying body can at the same time function as a wiping element to remove any dirt from the guide rail and in particular from its tracks and prevent the penetration of dirt, for example chips, into the region of the systems of rolling means.

With a U-shaped design of guide carriage, it is recommended that the treating element carrier likewise be of U-shaped construction with a web portion opposite a head surface of the guide rail and with flange parts opposite the lateral surfaces of the guide rail. Then, in each of the flange parts, a rail treating element may be provided for engagement with the respectively associated lateral surface of the rail, particularly in the track area.

In particular with regard to keeping dirt away from the rolling means system, it is recommended to provide a treating element carrier on each of two end faces of the guide carriage which are remote from each other in the axial direction.

The treating element can also be constructed as a scraping element. In fact, it has been demonstrated that particles of dirt frequently cling firmly to the guide rails, particularly in the case of machine tools in which hot chips can find their way into the region of the guide rail and these hot chips, particularly in conjunction with lubricant clinging to the guide rail, can become firmly baked on.

Since there is a risk of such impurities as chips remaining attached even outside the area of the track, it may be advantageous for the at least one rail treating element—when the guide rail profile is viewed in the axial direction of the guide rail—to act operatively on the guide rail beyond an associated track. In particular, it is also intended that the entire profile of the guide rail, in so far as this is not resting on a carrier, should be exposed to the action of rail treating elements, but at least that part of the profile which corresponds to the part where the guide rail is overlapped by the guide carriage.

A further aspect of the invention proposes a guide unit which has one axis and at least one guide carriage guided on the guide rail in the direction of its axis, whereby there are on the guide carriage at least two rail treating elements which are disposed for movement in a plane substantially at right-angles to the axis and are pre-tensioned against the guide rail in such a way that an abutment edge bears in each case on a peripheral portion of the guide rail profile. Such a linear guide means is known from European published specification No. 512 253 A1. In this case, the rail treating elements are formed by plates rigidly clamped at the ends of the guide carriage in planes at right-angles to the axis of the guide rail, their free ends being flanged over into the tracks so that their free ends rest on the tracks and are able to perform a scraping function at the edges of their free ends. With such an arrangement, it is not however possible for a prismatic or cylindrical guide rail to be exposed to the action of the treating elements over the surface of its entire profile. Instead, gaps remain between the rail treating elements which follow one another in the peripheral direction of the profile. According to the invention, however, it is suggested that the abutment edges of at least two rail treating elements which follow each other in the peripheral direction of the profile should be mutually overlapping. In this way, it becomes possible for the entire effective surface of a guide rail to be kept constantly free from dirt particles such as chips and to prevent such dirt penetrating the area of the rolling means systems. In the case of a U-shaped construction of the guide carriage with a web portion opposite a head surface of the guide rail and with two flange portions each opposite a lateral surface of the guide rail, it is possible for each of the flange portions to be associated with a rail treating element for a lateral surface of the guide rail and furthermore a rail treating element for treating the head surface of the guide rail may be associated with the web portion. Complete coverage of the profile by the treating elements can be achieved then when the two rail treating elements associated with the lateral surfaces overlap the rail treating element associated with the head surface in the peripheral direction of a guide rail.

The accommodation of a rail treating element or a plurality of rail treating elements in one treating element carrier can be carried out with particular ease with the sandwich-like assembly of the treating element carrier which consists of two carrier parts with contacting surfaces at right-angles to the axis of the guide rail. It is possible to construct in one of the carrier parts, in its contacting surface, a relief-like guide recess for the at least one rail treating element, this guide recess being closed by whichever is the other carrier part which is rigidly connected to the first-mentioned carrier part. The guide recess can thereby be formed by a main surface at right-angles to the axis of the guide rail and two mutually parallel marginal surfaces whereby then a further main surface is formed by whichever is the other carrier part.

In order to secure the treating element or elements against loss, securing means can with particular ease be provided in the region of the main surfaces and those surfaces of the respective treating element which are adjacent the reto. These anti-loss means may consist for instance of bolt-elongate hole combinations. The loss-preventive means may for example consist of an elongate hole in the relevant rail treating element and a bolt provided on a carrier part and adapted to engage an elongate hole, the elongate hole engaging bolt preferably being constructed in one piece on the respective carrier part. Such a one-piece manufacture of the elongate hole engaging bolt together with the respective carrier part is particularly simple if the carrier part is moulded or injection moulded from synthetic plastics material or is produced from metal in a pressure die-casting process.

The guide recesses can also be used to accommodate the pre-tensioning means which maintain the particular treating element in engagement with the guide rail. In this way, also the pre-tensioning means are covered, safeguarded against loss, protected from dirt, away from contact with human hands and attractively accommodated.

The pre-tensioning means may consist of coil thrust springs. In accordance with a preferred embodiment, the pre-tensioning means for pre-tensioning the rail treating element comprise a pre-tensioning member which at least on its surface consists of an elastomeric material and which, by the action of abutment means or by resting of the rail treating element against the guide rail, becomes clamped between an abutment surface on the guide carriage and a working surface on the rail treating element with an elastic deformation of the elastomeric material. In accordance with a preferred embodiment, it is envisaged thereby that the pre-tensioning member consist of a circular disc member which has an elastomeric ring on its peripheral surface while its axis is parallel with the axis of the guide rail. In accordance with a particularly simple embodiment, the elastomeric ring may be constructed as an O-ring.

If the at least one rail treating element is guided in a disc-shaped guide chamber substantially at right-angles to the axis of the guide rail, then it is possible to insert in this guide chamber, between an end surface of the rail treating element which is remote from the rail and a boundary surface of the disc-shaped guide chamber which is opposite said end surface which is remote from the rail, at least one pre-tensioning member which is guided between two main surfaces of the disc-shaped guide chamber and is secured in the working position in the disc-shaped guide chamber by a recess in the boundary surface and/or on that end face of the rail treating element which is remote from the rail.

From another aspect, the invention relates to a guide unit comprising a guide rail with an axis and at least one guide carriage guided on the guide rail in the direction of the axis whereby at least one rail treating element with a scraping edge is mounted on the guide carriage and, the rail treating element being pre-tensioned with the scraping edge towards the guide rail. With regard to the basic knowledge of such linear guide means, it is possible once again to refer to the already above-mentioned European published specification No. 512 253 A1. Once again, attention is drawn to the problem raised therein that it is virtually impossible to bring the scraping edges of a plurality of rail treating elements to bear uninterruptedly on the profile of a guide rail. In order to overcome this problem, it is therefore further proposed that the rail treating element be disc-shaped and disposed substantially at right-angles to the axis of the guide rail and have on an edge area close to the guide rail a scraping edge which is substantially rigid in the axial direction of the guide rail and in respect of the guide carriage. With such a construction, the above-mentioned overlapping of the scraping edges can easily be achieved.

The scraping edge is preferably disposed in the region of an end face of the disc-shaped rail treating element which remote from the guide carriage.

Nevertheless, it is possible to construct on the rail treating element and adjacent the scraping edge a blade surface which is directed away from the carriage.

The blade surface can thereby be constructed on the disc-shaped rail treating element, on a projection directed away from the guide carriage. Preferably, though, such a projection is avoided in order as far as possible to achieve without problem an overlapping of two disc-like rail treating elements which are adjacent each other in the direction of profile rotation.

Without substantially enlarging the axial space requirement for the rail treating elements, it is possible to provide on these latter, adjacent the scraping edges, integral blade surfaces in that there is a notch provided in the rail treating element.

Basically, a resilient mobility of the scraping edge in relation to the respective rail treating element is not necessary because in any case pre-tensioning means are provided in order to press the rail treating element and thus also its scraping element against the rail. In some cases, however, improved adaptation of the scraping edge to the pattern of the rail profile can be achieved by making the scraping edge resiliently deflectable in a direction at right-angles to the axial direction of the guide rail and in respect of the disc structure of the rail treating element to which the scraping edge belongs.

The overlapping of rail treatment elements which follow one another in the direction of profile rotation and in the region of their respective scraping edge can be easily achieved with minimal axial space requirement for the rail treating elements in that of two rail treating elements which overlap each other in the profile rotation direction of the guide rail, one has a marginal recess which is partially filled by whichever is the other.

The treating element carrier may be formed by at least one moulding which is injection moulded or cast from a synthetic plastics material. On the other hand, the at least one rail treating element may be made from a metal such as steel, brass, cast metal or equally from a polymeric material. In this respect, the hardness of the rail treating element will have to be determined in accordance with the particular scraping task involved.

The guide rail can be constructed on at least one lateral surface with a cross-sectionally trapezoidal profile depression so that the flanks of this profile depression form tracks for a respective endless system of revolving rollers. It is then possible to construct a corresponding trapezoidal projection on the associated rail treating element, its flanks being intended to cooperate with these tracks.

If a plurality of rail treating elements are provided on one carriage as is for example the case in European published specification 512 253 A1 and if all these rail treating elements have an initial tension in the direction of that part of the profile of the guide rail which is towards them, then mounting of the guide carriage on the guide rail can be made considerably more difficult. This is particularly true of the embodiment shown in European published specification No. 512 253 A1 where, during mounting of the guide carriage, a plurality of plates have to be bent over so that the guide carriage can be mounted on the guide rail. This problem becomes particularly difficult when the guide carriage carries a system of such plates at each of its two ends. Therefore, according to a further aspect of the invention, for the guide carriages of a guide unit according to the invention, it is suggested that these guide carriages be constructed with separable retaining means which maintain the rail treating element or elements in an inoperative position prior to mounting of the guide carriage on the guide rail, i.e. in a position in which, with a positionally correct approach of the guide carriage to one end of the guide rail, in the direction of the axis of the guide rail, the rail treating element remains disengaged from the guide rail. It is then possible for the guide carriage, without disturbance from the one or more rail treating elements, to be pushed freely onto whichever end portion of the guide rail is available and, only after being pushed on, for the positioning means to be slackened, loosened, removed or destroyed so that only then can the scraping edges of the rail treating elements come to bear against the respectively associated portion of the guide rail profile.

In particular, it is also possible, if a treating element carrier is available, for these separable positioning means to be provided between this treating element carrier and the treating elements.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

An example of embodiment of the invention is explained hereinafter with reference to the attached drawings in which:

FIG. 5 shows an end view of a rail treating unit, partially opened;

FIG. 6 shows a view of a treating element carrier of the rail treating unit;

FIG. 7 shows a section taken on the line VII—VII in FIG. 6;

FIG. 8 shows a section taken on the line VIII—VIII in FIG. 6;

FIG. 9 shows a section through the treating element carrier taken on the line VII—VII in FIG. 6, rail treating elements being inserted into the treating element carrier;

FIG. 10 shows a section taken on the line VIII—VIII in FIG. 6, the rail treating elements being inserted into the treating element carrier;

FIG. 11 shows a view of a cover for the treating element carrier according to FIG. 6;

FIG. 12 shows a section taken on the line XII—XII in FIG. 11;

FIG. 13 shows a view of the rail treating elements for the lateral surfaces of the guide rail;

FIG. 14 shows a view in the direction of the arrow XIV in FIG. 13;

FIG. 15 shows a view of a rail treating element for the head surface of the guide rail;

FIG. 16 shows a view in the direction of the arrow XVI in FIG. 15;

FIG. 17 shows a view of a pre-tensioning element for the rail treating elements and FIGS. 18 to 18e show various forms of scraping edge on rail treating elements.

DETAILED DESCRIPTION OF THE PREFERRED EMBODIMENTS

Figure 1:
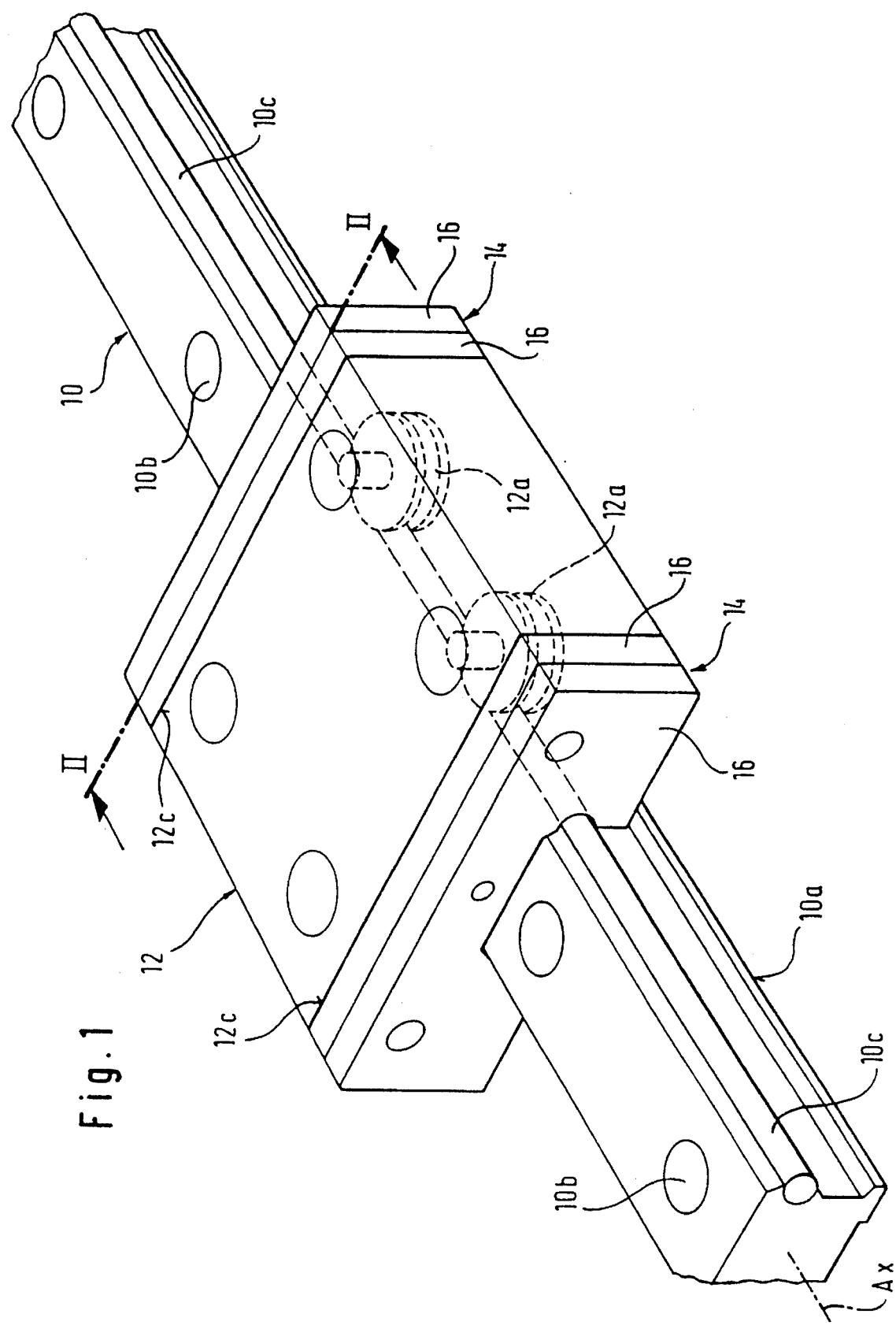
FIG. 1 is an overall view of linear guide means according to the invention.

FIG. 1 shows a guide rail generally designated 10. The axis of this guide rail is designated Ax. The underside of the guide rail is designated 10a and is intended to be mounted on a base or other carrier in fact by fixing bolts which are screwed into the base or foundation through stepped bores 10b which pass vertically through the guide rail 10. Mounted on both sides of the guide rail 10 are round profile bars 10c of which only one can be seen while the other is mounted on the back symmetrically in respect of a vertical central plane containing the axis Ax. Mounted on the guide carriage are guide rollers 12a of which only one front group can be seen although a corresponding rear group is in engagement with the (not shown) rear round profile bar 10c. A plate-shaped lubricating element carrier 14 is mounted on each of the axially perpendicular end faces 12c of the guide carriage 12. The lubricating element carriers are identical so that it is sufficient to describe only one of them.

Figure 2:
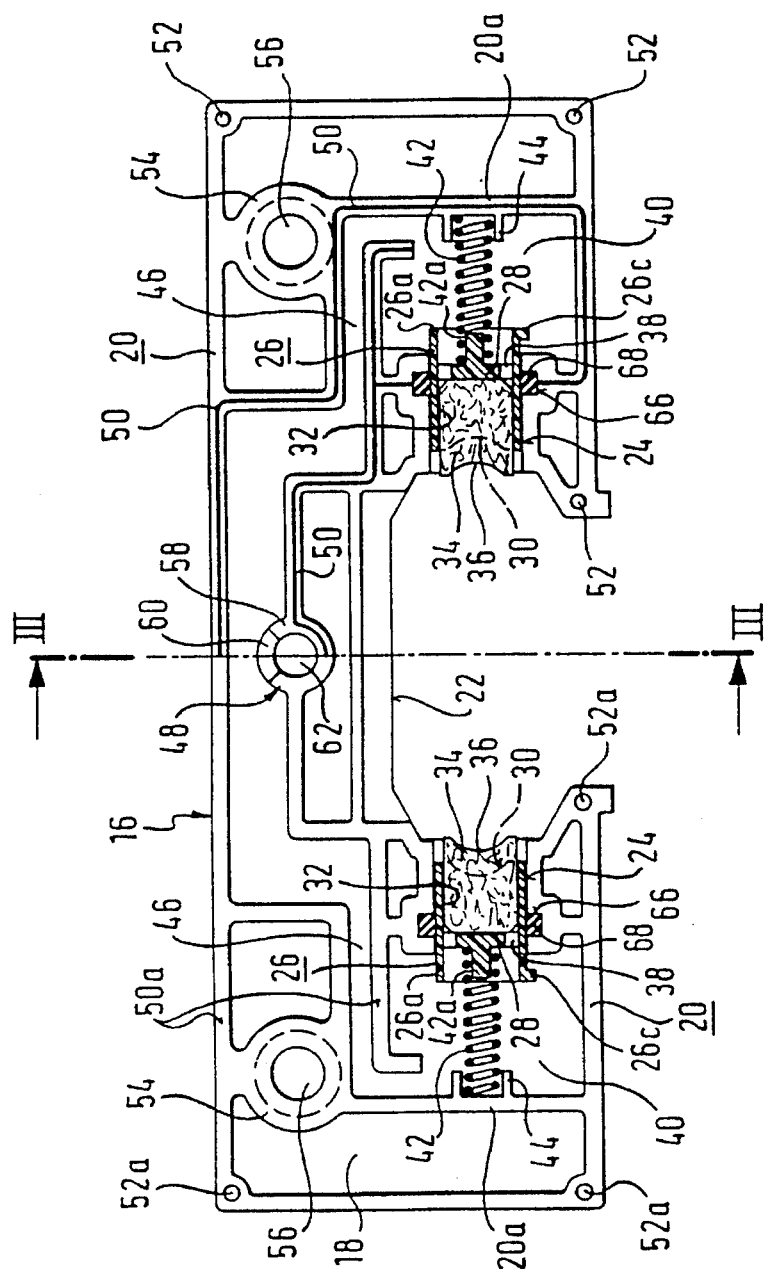
FIG. 2 is a view of a partial plate of a plate-like lubricating element carrier according to the invention.

Each lubricating element carrier 14 is composed of two plate-like parts 16, one of which is shown in FIG. 2. The partial plate 16 according to FIG. 2 consists of an outer wall 18 and a system of ribs 20 raised above this outer wall. The outer wall 18 comprises an inner contour 22 which is approximately adapted to the outer contour of the guide rail 10.

At the outset, it should be pointed out that two identical plate-like parts 16, such as are shown in FIG. 2, in each case form one lubricating element carrier, rib system 20 abutting rib system 20 so that cavities are formed between the oppositely disposed and spaced apart outer walls 18.

The two plates together define rectangular guides 24 for lubricating element fittings 26. These lubricating element fittings 26 each have an outer shell 26a to match the guides 24. In the middle of their guide length, these lubricating element fittings are subdivided by in each case one bracing plate 28. The bracing plates 28 are produced in one piece with the shell 26a. Adjacent an end aperture 30 which in the mounting state points towards the guide rail 10, there is inside each shell an accommodating chamber 32 which houses a track lubricating element 34 of felt. At its end projecting beyond the shell 26a and which is towards the track 10c, the track lubricating element 34 has a contour 36 adapted to the contour of the respective round profile bar 10c. The bracing plate 28 comprises apertures 38 which connect the accommodating chamber 32 to a lubricant supply chamber 40. The lubricant supply chamber is filled with a liquid lubricant. The track lubricating element 34 substantially completely fills the cross-section of the chamber 32 so that the free through-flow through the chamber 32 is blocked to the lubricant and lubricant is only able to pass out of the supply chamber 40 once it has permeated through the respective felt part to the surface of the round profile bar 10c.

Figure 3:
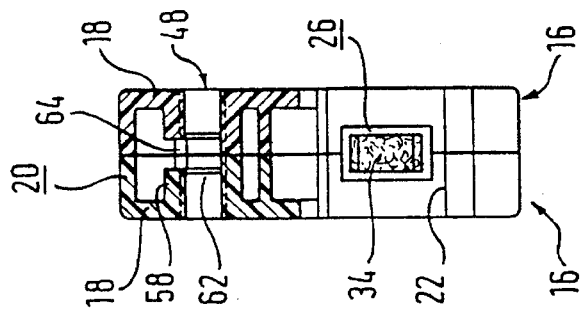
FIG. 3 shows a cross-section taken on the line III—III in FIG. 2.

The lubricating element fitting 26 is pre-tensioned in the direction of the guide rail 10 by a coil thrust spring 42. The coil thrust spring 42 is thereby biased on a bracing fitting 44 in the region of a rib 10a on the lubricating element carrier 14 and acts on the other hand on the bracing plate 28 which is constructed with a centring journal 42a for centring the coil thrust spring 42. In this way, the coil thrust spring 42 presses the lubricating element fitting 26 in the direction of the guide rail 10 and the end of the track lubricating element which projects in the direction of the guide rail has a profile contour 36 which rests on the circular round profile bar 10c. The supply chambers 40 on both sides of the inner profile contour 22 are connected by lubricant supply passages 46 to a lubricant supply point 48 which can be seen in detail in FIG. 3.

It can be seen that in the right-hand half of FIG. 2 welding beads 50 are formed on the ribs of the rib system and are missing in the left-hand half of the view in FIG. 2. If one imagines two plate-shaped parts 16 according to FIG. 2 superimposed in each case with the rib system 20 to form a sandwich structure as is provided in FIG. 1 on the respective end face 12c, then the welding beads 50 of one plate-like part 16 lie on obtuse rib head surfaces 50a of whichever is the other plate-like part.

A welding between the two plate-like parts 16 can then be carried out easily in these areas of the installation. As a preparation for welding, there are positioning journals 52 in one half of the plate-like parts and journal receiving holes 52a in whichever is the other half of the plate-like parts. Once again, one has to imagine the superimposition of the two plate-like parts 16 with rib system against rib system. Then the journals 52 on one part engage the holes 52a in the other part and vice versa. On the outer walls 18 there are furthermore round ribs 54 of an integral rib system the height of which corresponds to the height of whichever is the other rib system 20 so that these round ribs 54 come to rest on one another when the two plate-like parts 16 are combined and can be welded to one another. In this way, fixing apertures 56 are obtained by means of which the hollow box-like lubricating element carrier 14 can be fixed on the respective end face 12c of the guide carriage 12 by screw bolts or the like. The lubricant connection 48 is formed by annular ribs 58 on the two plate-like partial bodies 16 which likewise bear on and are welded to each other. Each of these annular ribs has an axial notch 60. These notches 60 together form a connection 64 (see FIG. 3) from the through-way 62 in the lubricant connection 48 to the lubricant supply passage 46 which connects the lubricant storage chambers 40 to the lubricant connection 48. The through-way aperture 62 can be closed at one end while at the other end it can be connected to a nipple in the form of a non-return valve which allows lubricant to be forced in but prevents escape.

It must also be added that if there is not already due to the bearing contact between the guide 24 and the lubricating element fitting 26 a seal which is adequate having regard to the lubricant used, then it is possible to let an annular groove 66 into the inner peripheral face of the guide 24. Of this annular groove 66, one half is provided in each of the two plate-like parts 16. The annular groove 66 accommodates a gasket 68, It must also be added that the fitting housing 26 has at its end remote from the guide rail an abutment 26c which after the guide carriage 16 has been withdrawn from the guide rail 10 or after the lubricating element carrier 14 has been removed from the guide carriage 12, prevents complete ejection of the guide housing 26 from the guide 24 and so captively connects the fitting 24 to the lubricating element carrier 14. Furthermore, the track lubricating element 34 is accommodated within the fitting housing 26 in such a rigid seating that it is likewise captive.

Figure 4:
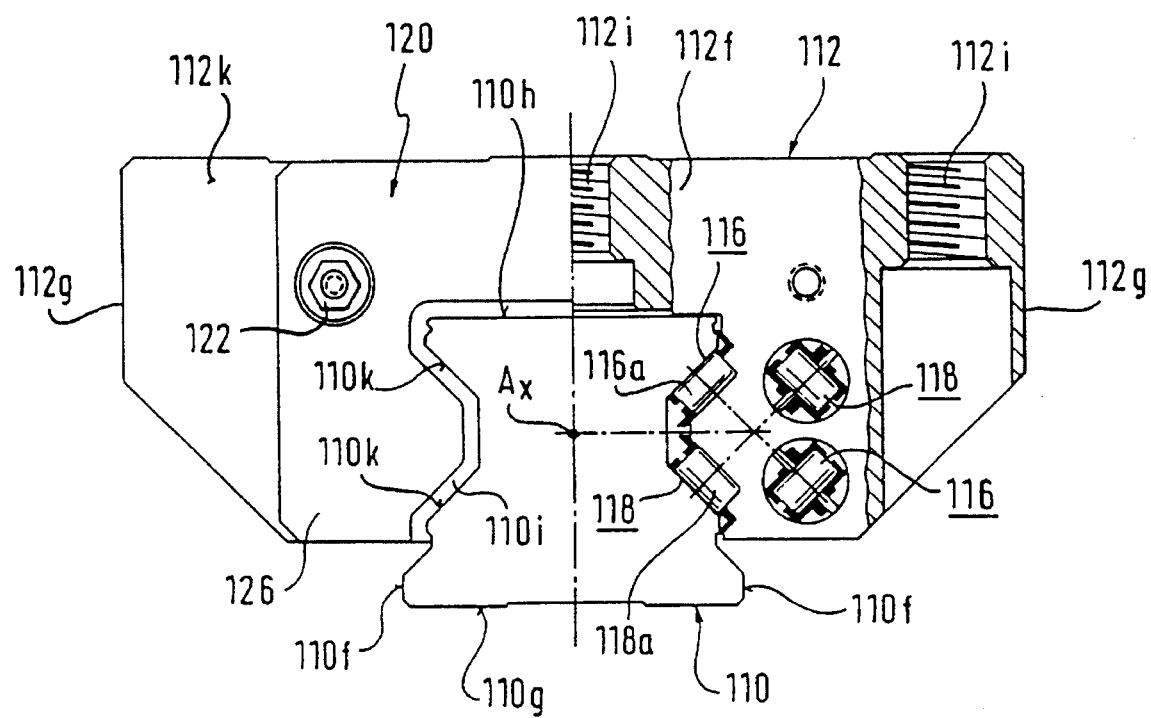
FIG. 4 shows an end view, partly in section, of a further linear guide means according to the invention, with a rail treating unit.

FIG. 4 shows a guide rail 110 and a guide carriage 112 guided on this guide rail. The guide rail 110 has two lateral surfaces 110f, a bottom surface 110g and a head surface 110h. Each of the lateral surfaces 110f has a trapezoidal groove 110i. The flanks of this trapezoidal groove 110i are designated 110k; these flanks forms tracks for rows of rollers.

As can be seen in FIG. 5, the guide rail 110 has its bottom surface 100g fixed to a carrier 114 and for this purpose it is provided at intervals along its axis $A_x$ with bores 110l to receive fixing bolts.

As FIGS. 4 and 5 show, the guide carriage 112 is constructed with a web portion 112f and flange portions 112g. The web portion 112f is situated opposite the head surface 110h while the flange portions 112g are opposite the lateral surfaces 110f. The guide carriage 112 is guided on the guide rail by loops 116 and 118 of rollers, The load-transmitting rows of rollers 116a and 118a of these roller loops 116, 118 are guided on the one hand on the tracks formed by the flanks 110k and on the other on tracks of the guide carriage 112. An object for example a machine tool table can be mounted on the guide carriage 112 in these fixing bores 112i.

The left-hand half of FIG. 4 shows a rail treating unit 120 fixed on the end face 112k of the guide carriage 112. The rail treating unit 120 is mounted on the end face of the guide carriage 112 by fixing screws 122.

Details of the rail treating unit 120 can be seen in FIGS. 5 to 17.

FIG. 5 shows a treating element carrier 124 which is composed of a carrier plate 126 and a cover 128. Carrier plate 126 and cover 128 are traversed by fixing bores 130 which are traversed by the bolts 122 for fixing the treating element carrier 124 in the guide carriage. The cover 128 is fixed to the carrier plate 126 by fixing screws 134.

The treating element carrier 124 comprises a web part 124f and flange parts 124g which are associated with the web portion 112f and the flange portions 112g of the guide carriage as illustrated in FIG. 4.

In each of the flange parts 124g in the carrier plate 126 there are counter-sunk in relief fashion disc-shaped guide chambers 136 which are constructed with a main surface 136a at right-angles to the axis $A_x$ and marginal surfaces 136b and 136c. Furthermore, the disc-shaped guide chambers 136 are masked by the covers 128. Guided in the disc-shaped guide chambers 136 are disc-shaped treating elements 140, in fact they are guided by the main surface 136a, the cover 128 and the marginal surfaces 136b. The disc-shaped rail treating elements 140 have scraping edges 142 which are intended and constructed for scraping the tracks 110k. The scraping edges 142 are pressed against the tracks 110k by pre-tensioning members 144 which consist of synthetic plastics discs of circularly cylindrical cross-section. Elastically compressible O-rings 144b of elastomeric material, e.g. natural rubber, are inserted into the peripheral surfaces of the synthetic plastics discs 144a. The synthetic plastics discs 144a bear in freely movable manner on the main surface 136a and on the cover 128. In the treating element 140, adjacent its edge 148 which is remote from the rail there are semi-circular recesses 146 which loosely accommodate and position the pre-tensioning members 144. Furthermore, for positioning the pre-tensioning members 144 segmental troughs 149 are formed in the marginal area 136c of the disc-shaped guide chamber. When the guide carriage 112 is mounted on the guide rail 110, the pre-tensioning members 144 press the rail treating element 140 through its scraping edges 142 against the tracks 110k of the guide rail 110. In this case, the O-rings 144b are resiliently compressed between the recesses 146 and the troughs 149. It can be seen that the scraping edges 142 are exactly adapted to the pattern of the profile of the lateral surface 110f of the guide rail 110, even to the extent that the guide rail exhibits fine structures, for example at 110m. The fine structure at 110m can be intended to be engaged around by a cover plate of the head surface 110h which covers the entire head plate 110h completely in order also in the region of the fixing bores 110l to provide a uniform surface structure of the head surface 110h. It can furthermore be seen that the guide rail 110 in its entire height h in which the guide rail has the guide carriage 112 engaging over it, engages the scraping edges 142 of the rail treating element 140.

When the guide carriage 112 is separated from the guide rail 110, the rail treating element 140 ought not to emerge from the disc-shaped guide chamber 136. In order to prevent the treating element 140 emerging from the guide chamber 136, securing means are provided in the form of an elongate hole 150 in the rail treating element 140 and an elongate hole engaging bolt 152 which extends from the main surface 136a of the disc-shaped guide chamber 136, through the elongate hole 150. In contrast to the elongate hole engaging bolt 152, the elongate hole 150 has a certain lateral clearance in all directions. In this case, the lateral clearance in the guidance direction h determined by the marginal surfaces 136b is so dimensioned that on the one hand, when the guide carriage 112 is mounted on the guide rail 110, pressing of the scraping edges 142 against the tracks 110k is not adversely affected and on the other hand, when the guide carriage 112 is removed from the guide rail 110, the rail treating element 140 cannot be pushed by the effect of the expansion of the elastically compressed O-rings 114*b* out of the guide by the disc-shaped guide chamber 136.

Also in the web part 124*f* of the treating element carrier 124, the carrier plate 126 has a disc-shaped guide chamber 156 which is bounded by a main surface 156*a* and marginal surfaces 156*b*, 156*c* and which is once again completed by the cover 128. Accommodated in this disc-shaped guide chamber 156 is a rail treating element 158 for the head surface 110*h* of the rail 110 or its cover plate. This rail treating element 158 has a scraping edge 160 which is pressed against the head surface 110*h* of the guide rail 110 by pre-tensioning means 144. The mounting of the pre-tensioning means 144 inside the disc-shaped guide chamber 156 corresponds to the mounting of the pre-tensioning means 144 inside the guide chamber 136. The rail treating element 158 is safeguarded against being pushed out of the disc-shaped guide chamber 156 by an elongate hole-bolt combination 150, 152, the effect of which is the same as in the case of the rail treating element 140.

FIG. 5 shows that the rail treating elements 140 and 158 overlap in a region U at the edge between the lateral surface 110*f* and the head surface 110*h*. This overlapping is necessary for the su trace of the guide rail 110 to be subjected to a scraping treatment in this critical area as well. The overlapping effect is made possible in that the treating element 158 has adjacent the scraping edge 160 a recess 164 engaged by the upper marginal areas 166 of the treating elements 140. The overlap can be seen particularly in FIG. 9.

Figure 18A:
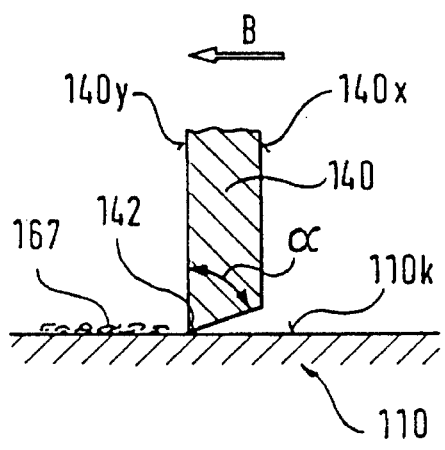

FIG. 18*a* shows a cross-section through the scraping edge 142 Here, the lateral surface 140*x* is closer to the guide carriage while the lateral surface 140*y* of the treating element 140 is more remote from the guide carriage. It can be seen that the scraping edge 142 is likewise disposed in the surface 140*y*, remote from the guide carriage. The purpose of the scraping edge 142 is to scrape off the working surface chips and other impurities even if they are clinging rigidly to the working surface 110*k*. The chips are shown at 167 in FIG. 18*a*; they are scraped off when the guide carriage which is not shown in FIG. 18*a* but which is situated on the right-hand side of the treating element 140, is moved in the direction B parallel with the rail axis $A_x$.

Figure 18B:
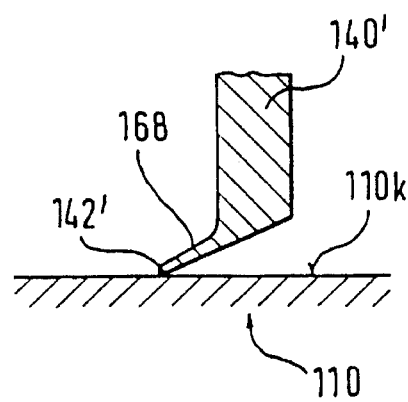

FIG. 18*b* shows a scraping edge 142' which is disposed on the treating element 140' at the tip of a blade surface 168.

Figure 18C:
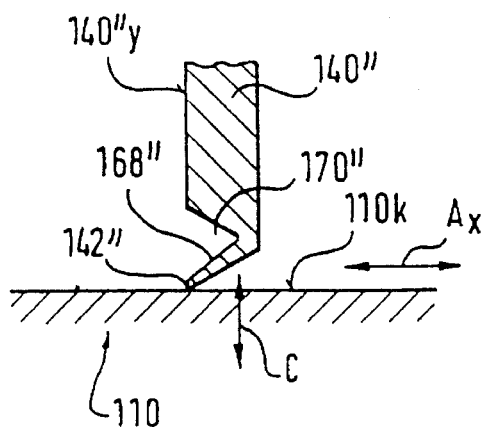

FIG. 18*c* once again shows another embodiment in which the scraping edge 142" of a treating element 140" is constructed at the tip of a blade surface 168". In this case, the blade surface 168" is shaped by a notch 170" made in the lateral surface 140"*y* which is remote from the guide carriage. In the case of this embodiment, the blade surface 168" and the edge 142" are in the axial direction $A_x$ substantially rigid in comparison with the body of the treating element 140". In contrast, by reason of the notch 170", the blade surface 168" and the scraping edge 142" are resilient in the direction C if the notch 170" is made sufficiently deep.

Figure 18D:
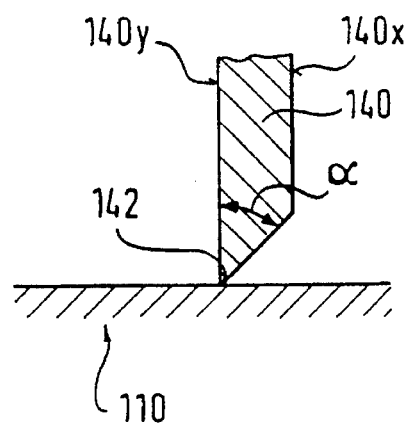

In the embodiment shown in FIG. 18*d*, it is possible to recognise a geometry of the treating element 140 which only differs from that in FIG. 18*a* in that the angle α is more acutely angled than in FIG. 18*a*.

Figure 18E:
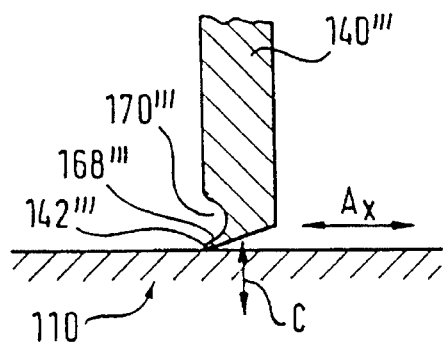

Finally, FIG. 18*e* shows a modified embodiment in which the notch 170''' has a round cross-section instead of the triangular cross-section shown in FIG. 18*c*. Here, too, a blade surface 168''' is again formed adjacent the scraping edge 142'''. Here, too, the scraping edge 142''' may be resilient in the direction C if the notch 170''' is appropriately dimensioned. In the axial direction $A_x$ on the other hand, the scraping edge is once again substantially rigid in relation to the rail treating element 140'''.

When mention is made of a scraping edge, this is intended to mean that this scraping edge is suitable for scraping impurities, even clinging impurities, from the relevant track or other treated surface of the guide rail. The intention of the scraping is less to remove the actual material of the guide rail 110.

The choice of material for the treating elements and in particular for the scraping edges is made according to the envisaged application. If it is anticipated that the guide rail has strongly encrusted chippings or cuttings, then the rail treating element must be made from a relatively hard material if the rail treating elements are to enjoy a long, effective life. In this case, metallic rail treating elements are particularly suitable. In addition, rail treating elements of synthetic plastics material are also possible.

Where the manufacture of the carrier plate 126 and of the cover 128 is concerned, metallic materials may likewise be used, particularly materials which can be worked in a pressure die-casting process, in order in this way to be able easily to construct the guide chambers 136 and 156. However, it is also possible to use synthetic plastics materials for producing the carrier plate 126 and cover 128, particularly by the injection moulding process.

Mounting of the guide carriage 112 on the guide rail 110 can be carried out once the treatment unit 120 has already been screwed onto the guide carriage 112 by means of screws 122. Mounting of the guide carriage together with the treatment units 120 screwed to it, onto the guide rail 110 can be facilitated if the guide rail has at its ends chamfered lead-in surfaces which push back the treating elements 158 and 140 operatively against the effect of the elastic pre-tensioning means 144 when the guide carriage 112 is pushed into place.

In addition, it is also possible basically to supply the guide carriages with a guide member the length of which is approximately equal to or preferably slightly greater than the length of the guide carriage. This guide member can in turn be constructed at one end with chamfered lead-in surfaces so that assembly of the guide carriage with the guide member is facilitated. Then, when it is desired to mount the guide carriage on the guide rail, on which it will remain while it is working, the guide member can be maintained in alignment with this guide rail, possibly securing it by positive engagement. At its end abutting the guide rail, the guide member is then so constructed that it forms the smoothest possible transition to the guide rail. Then, the guide carriage can be pushed over from the guide member maintained in alignment with the guide rail and onto the guide rail without this pushing-over process being impeded by the treating elements pre-tensioned in the direction of the guide member and later onto the guide rail.

Mounting onto the guide rail of the guide carriage already assembled together with the treatment units can also be facilitated by the provision of positioning means or retaining means so that the treating elements 140 and 158 are initially maintained in an ineffective position. For example, it is possible to push into the elongate hole 150 according to FIG. 5, between the left-hand end of the elongate hole and the left-hand end of the elongate hole engaging bolt 152 a filler piece 170 if a filler piece insertion aperture 172 is provided in the cover 128, according to FIG. 11. By virtue of this filler piece 170, then, the rail treating elements 140 and 158 are maintained in an inoperative position in which the guide carriage 112 can be pushed onto the guide rail without being hindered by the rail treating elements 140 and 158. Only when the guide carriage 112 is pushed onto the guide rail 110 are the filler pieces 170 withdrawn through the cover apertures 172 so that the rail treating elements 140 and 158 can only then bring their scraping edges 142, 160 to bear on the rail surface. If there is a possibility of keeping the rail treating elements 140 and 158 in an inoperative position by positioning or retaining elements rather like the filler pieces 170, then it is also readily possible to mount a completely pre-assembled rail treating unit 120 on the guide rail separately from the guide carriage, connecting it to this latter only when it is on the guide rail, particularly by means of a screwed joint. In this way, the rail treating units 120 can be exchanged without removing the guide carriage from the guide rail. This may be advantageous if the entire linear guide means is mounted in a confined space on an overriding machine or device.

The principle of maintaining the rail treating elements in an inoperative position by positioning or retaining means until mounting of the guide carriage on the guide rail or until mounting of the rail treating units on the guide carriage which is already mounted on the guide rail is completed can also be employed in the case of other embodiments of rail treating units having rail treating elements pre-tensioned in the direction of the guide rail, for example even in the case of rail treating elements which are constructed with plate-like rail treating elements in accordance with European published specification 512 253 A1 (see FIG. 5, item designated by reference numeral 9). There, the plate-like rail treating elements could for instance be maintained in an inoperative position by a wire or synthetic plastics thread, keeping them angled over sufficiently that when the guide carriage is pushed onto the guide rail, they do not collide with the guide rail. Then, when the guide carriage has been mounted on the guide rail, the wires or synthetic plastics threads could simply be pinched off so that the plates then come to rest on the guide rail.

FIG. 5 shows that the scraping edge 142 of the rail treating element 140 is precisely adapted to the pattern of the profile of the guide rail 110 in the region of its lateral surface 110ƒ. The guide rails 110 are produced with extreme precision in order accordingly to achieve accurate guidance of guided objects in an overriding machine. Precision of the order of just a few microns must be taken into account. There are no difficulties in precisely manufacturing the scraping edges 142 in order to achieve an even gap-free bearing of the scraping edge 142 on the lateral surface 110ƒ over the entire profile involved. In order now to ensure that actually a gap-free application is achieved along the entire area of the profile in question, the rail treating element 140 which is guided by the marginal surfaces 136b in a direction at right-angles to the axial direction $A_x$ can be allowed a certain translatory and rotatory clearance in relation to the marginal surfaces 136b, so that regardless of the accuracy with which the marginal surfaces 136b are manufactured and disregarding the precision with which the rail treating element carrier 124 is fixed, the scraping edge 142 of the rail treating element can adapt precisely to the profile pattern of the lateral surfaces 110ƒ. This measure is particularly advantageous if the pattern of the rail profile and of the scraping edge 142 is other than rectilinear. It goes without saying that also the elongate hole 150 and the elongate hole engaging bolt 152 have to allow a corresponding clearance.

Guidance of the rail treating element 158 on the marginal surfaces 156b can be performed accordingly.

With regard to guidance of the rail treating elements 140 and 158 on the main surfaces and guide surfaces 136a and 156a, the following remarks should be added: it can be seen from FIG. 7 that these main surfaces 136a and 156a are offset in respect of each other in the direction $A_x$ and FIG. 9 shows that the thickness of the rail treating element 158 in the axial direction $A_x$ is greater than the thickness of the rail treating element 140. The recess 164 in the rail treating element 158 corresponds in its depth to the thickness of the rail treating element 140.

In this way, the marginal portion 166 of the rail treating element 140 rests flat on the rail treating element 158 in the region of its recess 164. This flat contact, in conjunction with the overlapping effect, is important for the entire surface of the profile of the guide rail 110 to be exposed to the treatment, so that no particles of dirt in the area of overlap U of the two rail treating elements 140 and 158 can find their way through. By reason of the design of the carrier part 126 according to FIG. 7, it becomes possible for the side of the cover 128 which rests on the rail treating elements 140, 158 to be made continuously flat.

The linear guide means according to the invention can in any event always be used when a guide carriage with rolling guide means is guided on the guide rail. In addition to the rolling guide means described by way of example and in accordance with FIGS. 1 and 4, it is also conceivable to use endless loops of balls on the guide carriage, as described for instance in DE-OS 36 20 571.

With regard to the pre-tensioning means 144, it should also be mentioned that it is possible to dispense with the synthetic plastics disc 144a. An 0-ring 144b is sufficient to achieve pre-tensioning of the rail treating elements 140, 158. In this case, the 0-ring 144b must be adapted to the gap between the main surface 136a and the cover 128.

While specific embodiments of the invention have been shown and described in detail to illustrate the application of the inventive principles, it will be understood that the invention may be embodied otherwise without departing from such principles.

We claim:

1. A linear guide unit comprising a guide rail with an axis and at least one track and at least one guide carriage with at least one running element which in an operating condition is guided on this track, whereby there is mounted on the guide carriage a treating unit carrier for at least one rail treating unit, said rail treating unit being guided on the treating unit carrier in a plane substantially orthogonal to the axis by guide means and being pre-tensioned toward the guide rail, said rail treating unit being captively disposed in the treating unit carrier, said rail treating unit having abutment means cooperating with counter-abutting means on the treating unit carrier, said abutment means and counter-abutting means limiting the mobility of the rail treating unit which is allowed by the guide means.

2. A linear guide unit as claimed in claim 1, said rail treating unit being a track treating unit.

3. A linear guide unit as claimed in claim 1, said rail treating unit being a track lubricating unit.

4. A linear guide unit as claimed in claim 3, said track lubricating unit being constructed with a capacity for conducting lubricant such that, in relation to the viscosity of whichever lubricant is used, there is substantially no loss of lubricant in directions at right-angles to a guidance direction of the track lubricating unit with respect to said treating element carrier.

5. A linear guide unit as claimed in claim 3, said track lubricating unit comprising a lubricating element consisting of a material capable of moulding to a respective track and distributing a lubricant, said lubricating element communicating with a lubricant supply provided within said treating unit carrier.

6. A linear guide unit as claimed in claim 5, said lubricating element being housed in a lubricating element fitting, said lubricating element fitting being guided on the treating unit carrier and being provided with said abutment means.

7. A linear guide unit as claimed in claim 6, said lubricant supply being accommodated outside the lubricating element fitting but within the treating unit carrier and a lubricant connection being provided between the lubricant supply and the lubricating element housed inside the lubricating element fitting.

8. A linear guide unit according to claim 7, said lubricating element fitting comprising a fitting housing with a lateral surface substantially parallel with a guidance direction of the lubricating element fitting, said fitting housing having an end portion open toward the respective track, the lubricating element projecting beyond this open end portion toward the respective track.

9. A linear guide unit as claimed in claim 8, said fitting housing having adjacent an end portion remote from the track an aperture which communicates with the lubricant supply.

10. A linear guide unit as claimed in claim 8, said fitting housing extending through sealing means.

11. A linear guide unit as claimed in claim 8, wherein at a midway location of the fitting housing a bracing member is provided which serves, on the one hand, as an abutment for the lubricating element introduced into the fitting housing from the end portion open toward the track and, on the other hand, serves as an abutment face for a pre-tensioning spring.

12. A linear guide unit as claimed in claim 11, said bracing member being constructed with a centering mandrel for a coil thrust spring.

13. A linear guide unit as claimed in claim 11, said bracing member only filling a part of a cross-sectional area of the fitting housing and leaving apertures for lubricant entrance into the fitting housing.

14. A linear guide unit as claimed in claim 6, said lubricating element fitting comprising a fitting housing, the abutment means being provided by an outwardly projecting shoulder on the fitting housing near its end portion remote from the track.

15. A linear guide unit as claimed in claim 6, said lubricating element being received inside the lubricating element fitting by friction fit.

16. A linear guide unit as claimed in claim 5, said lubricating element consisting of a porous lubricant-conductive material.

17. A liner guide unit as claimed in claim 16, said lubricating element filling substantially an entire cross-sectional area of a lubricating element fitting which is constructed with a fitting housing.

18. A linear guide unit as claimed in claim 5, said lubricating element being formed by a felt member.

19. A linear guide unit as claimed in claim 5, a lifetime filling of lubricant being contained inside the treating unit carrier.

20. A linear guide unit as claimed in claim 5, said lubricant supply being constructed with a lubricant connection for a lubricant topping-up unit.

21. A linear guide unit as claimed in claim 20, said lubricant topping-up comprising a lubricating nipple with a non-return action.

22. A linear guide unit as claimed in claim 5, wherein the treating unit carrier is provided with a plurality of track lubricating units, each of said track lubricating units being provided with a material capable of moulding to a respective track and distributing lubricant, said track lubricating units inside the treating unit carrier being pre-tensioned toward respective tracks in a direction substantially at right-angles to the axis and communicating with a supply of lubricant in the treating unit carrier, at least two of said track lubricating units being connected to a common lubricant supply space containing a lifetime filling of lubricant.

23. A linear guide unit as claimed in claim 5, said treating unit carrier being constructed as a housing which closes off the lubricant supply and lubricant conducting paths in a sealing tight manner, said housing having in operation a lubricant through flow connection to a space external of said housing only through said at least one track lubricating unit.

24. A linear guide unit as claimed in claim 23, wherein the housing consists of two housing parts which bear on each other through interposed sealing zones.

25. A linear guide unit as claimed in claim 24, wherein the housing parts are traversed by fixing apertures for mounting the housing on the guide carriage and wherein the housing parts are sealed in respect of each other also in areas around these fixing apertures.

26. A linear guide unit as claimed in claim 24, wherein said housing parts are provided with respective gasket sections for providing gasket assemblies around respective lubricating units.

27. A linear guide unit as claimed in claim 1, a plurality of tracks being provided on the guide rail, said treating element carrier being a common treating element carrier for a plurality of rail treating units allocated to different tracks.

28. A linear guide unit as claimed in claim 27, said common treating element carrier being provided with two oppositely disposed track lubricating elements substantially aligned with each other.

29. A linear guide unit as claimed in claim 1, said treating unit carrier being constructed as a plate-like structure which is mounted on an end face of the guide carriage, said end face being substantially at right-angles to the axis of the guide rail.

30. A linear guide unit as claimed in claim 29, said treating unit carrier having an inner peripheral contour which is approximately adapted to an external contour of said guide rail guide.

31. A linear guide unit as claimed in claim 30, contour sealing means being provided adjacent said internal peripheral contour of said treating unit carrier and said external contour of said guide rail.

32. A linear guide unit as claimed in claim 1, said treating unit carrier being constructed as a flat housing which is separably fastened as a separate component of the guide carriage on at least one end face of the guide carriage which end face is substantially at right-angles to the axial direction of the guide rail.

33. A linear guide unit as claimed in claim 32, said flat housing being assembled from two flat housing parts which bear on each other like a sandwich.

34. A linear guide unit as claimed in claim 33, each of said flat housing parts comprising a main wall and ribs extending at right-angles from the respective main wall, said flat housing parts being substantially symmetrical in respect of a common central plane parallel with the main walls.

35. A linear guide unit as claimed in claim 34, said flat housing parts being of identical construction.

36. A linear guide unit as claimed in claim 35, wherein at least one of sealing and connecting means are disposed over only half of a respective head surface area of the ribs of a respective flat housing part so that in an assembled state of the flat housing parts these sealing and connecting means are distributed over the entire contact area between the flat housing part and complement each other.

37. A linear guide unit as claimed in claim 33, wherein the flat housing parts are connected to each other by one of welding, ultrasonic welding and gluing.

38. A linear guide unit as claimed in claim 1, wherein said at least one running element is formed by a guide roller.

39. A linear guide unit as claimed in claim 38, wherein said guide roller has a concave engagement surface which engages a matching profile forming a track.

40. A linear guide unit as claimed in claim 39, wherein said profile is formed by a round profile bar of approximately circular cross-section which is fixed on a basic guide rail member.

41. A linear guide unit as claimed in claim 1, wherein said guide carriage surrounds the guide rail approximately in a U-shaped manner and wherein at least one guide element is disposed on each of two side parts of the U-shaped guide carriage.

42. A linear guide unit as claimed in claim 1, wherein the rail treating unit is guided within the treating unit carrier by rectilinear guide means.

43. A linear guide unit comprising a guide rail with an axis and a guide rail profile and at least one guide carriage guided on the guide rail in the direction of its axis, wherein at least two rail treating units are disposed on the guide carriage and are adapted for movement in a plane substantially at right-angles to the axis and are pre-tensioned toward the guide rail so that each of them has a contact edge resting on a part of the periphery of the guide rail profile, the contact edges of the at least two rail treating units mutually overlapping in the peripheral direction of the guide rail profile.

44. A linear guide unit as claimed in claim 43, wherein the guide carriage is U-shaped with a web portion opposite a head surface of the guide rail and with two flange portions each opposite a lateral surface of the guide rail and wherein there is associated with each of the flange portions a rail treating unit for a lateral surface of the guide rail and wherein there is associated with the web portion a rail treating unit for the head surface of the guide rail.

45. A linear guide unit as claimed in claim 44, wherein both rail treating units associated with the lateral surfaces overlap in the peripheral direction of the guide rail profile the rail treating unit associated with the head surface.

46. A linear guide unit as claimed in claim 43, wherein a sandwich-like assembly of the treating unit carrier consists of two carrier parts having contact surfaces at right-angles to the axis, one of these carrier parts having a contact surface constructed in relief fashion with guide recesses for the at least two rail treating units, these guide recesses being closed by whichever is the other carrier part.

47. A linear guide unit as claimed in claim 46, wherein a guide recess is formed by a main surface at right-angles to the axis and two mutually parallel marginal surfaces, whichever is the other carrier part forming a further main surface at right-angles to the axis.

48. A linear guide unit as claimed in claim 47, wherein to safeguard a respective rail treating unit from escaping from the guide recess, loss preventive means are provided adjacent one of the main surfaces.

49. A linear guide unit as claimed in claim 48, wherein the loss preventive means are constructed as bolt-and-elongate hole securing means.

50. A linear guide unit as claimed in claim 49, wherein the loss preventive means consist of an elongate hole in the respective rail treating unit and an elongate hole engaging bolt on a carrier part.

51. A linear guide unit as claimed in claim 46, wherein in a guide recess are provided pre-tensioning means for pre-tensioning the respective rail treating unit toward the guide rail.

52. A linear guide unit as claimed in claim 43, wherein pre-tensioning means for pre-tensioning the rail treating unit are formed by at least one respective coil thrust spring.

53. A linear guide unit as claimed in claim 43, wherein a pre-tensioning member, which at least adjacent its surface consists of an elastomeric material, is clamped between an abutment surface of the guide carriage and an engagement surface on the rail treating unit with an elastic deformation of the elastomeric material.

54. A linear guide unit as claimed in claim 53, wherein the pre-tensioning member consists of a circular disc member which has an elastomeric ring on its peripheral surface while its axis is parallel with the axis of the guide rail.

55. A linear guide unit as claimed in claim 54, wherein the elastomeric ring is constructed as an O-ring.

56. A linear guide unit as claimed in claim 53, wherein at least one rail treating unit is guided in a disc-shaped guide chamber substantially at right-angles to the axis of the guide rail and wherein in this disc-shaped guide chamber there is inserted between an end face of the rail treating unit remote from the rail and a boundary surface of the disc-shaped guide chamber opposite said end face at least one pre-tensioning member, said at least one pre-tensioning member being guided between two main surfaces of the disc-shaped guide chamber and being maintained in its working position by a recess in at least one of said end face of the rail treating unit and said boundary surface of the disc-shaped guide chamber.

57. A linear guide unit as claimed in claim 43, wherein said rail treating units are disc-shaped and disposed substantially at right-angles to the axis of the guide rail, said rail treating units having adjacent respective edge areas close to the guide rail respective scraping edges, which are substantially rigid with respect to the guide carriage in the axial direction of the guide rail.

58. A linear guide unit as claimed in claim 57, wherein a scraping edge is disposed in the region of an end face of the disc-shaped rail treating unit, which end face is remote from the guide carriage.

59. A linear guide unit as claimed in claim 57, wherein adjacent the scraping edge there is on the rail treating unit a shovel-like surface which is directed away from the guide carriage.

60. A linear guide unit as claimed in claim 59, wherein the shovel-like surface is constructed on a projection of the disc-shaped rail treating unit which is directed away from the guide carriage.

61. A linear guide unit as claimed in claim 59, wherein the shovel-like surface is formed by a notch in the disc-shaped rail treating unit.

62. A linear guide unit as claimed in claim 57, wherein the scraping edge is mounted on a disc structure of the rail treating unit in such a way as to be resiliently deflectable in a direction at right-angles to the axial direction of the guide rail.

63. A linear guide unit as claimed in claim 43, wherein one of two rail treating units which overlap each other in a peripheral direction of the guide rail profile is provided with a marginal recess which is partially filled by the other rail treating unit.

64. A linear guide unit as claimed in claim 43, wherein the treating unit carrier is formed by at least one moulding which is injection moulded or cast from a synthetic plastics material.

65. A linear guide unit as claimed in claim 43, wherein the guide rail has at least one lateral surface with a cross-sectionally trapezoidal profile depression, flanks of this profile depression forming tracks for respective endless circuits of rolling bodies, and wherein at least one rail treating unit has a correspondingly trapezoidal projection with flanks adapted to cooperate with said tracks.

66. A linear guide unit as claimed in claim 43, wherein the rail treating units bear on each other in the area of overlapping.

67. A linear guide unit as claimed in claim 43, wherein the rail treating units bear on guide surfaces which are substantially at right-angles to the axial direction and which are offset in respect of each other in the axial direction of the guide rail.

68. A linear guide unit as claimed in claim 67, wherein the guide surfaces which are offset in respect of each other in an axial direction and which are substantially at right-angles to the axial direction are formed on a first of two carrier parts which bear flat on each other, the rail treating units, corresponding to the offset of the guide surfaces, being of different thickness measured in the axial direction, a thicker one of the two rail treating units being provided with a marginal recess approximately corresponding to the thickness of a thinner one of the two rail treating units, the thinner one of the two rail treating units having a marginal portion which engages the marginal recess.

69. A linear guide unit as claimed in claim 68, wherein a second one of the two carrier parts which bear flat on each other has a common flat surface bearing on the two rail treating units.

70. A linear guide unit as claimed in claim 43, wherein at least one of the rail treating units has in a plane at right-angles to the axial direction a guidance play which allows a self-adaptation of the contact edge to an associated part of the guide rail profile.

71. A linear guide unit as claimed in claim 43, wherein the rail treating units, when the guide rail profile is viewed in the axial direction of the guide rail, treatingly act on the guide rail beyond associated tracks.

72. A linear guide unit as claimed in claim 1 or 43, wherein the at least one rail treating element is produced from a metal such as steel, brass or cast metal or from a polymeric material.

73. A linear guide unit comprising a guide rail with an axis and at least one track and at least one guide carriage with at least one running element which in an operating condition is guided on this track, whereby there is mounted on the guide carriage a treating unit carrier for at least one rail treating unit, said rail treating unit being guided on the treating unit carrier in a plane substantially orthogonal to the axis by guide means and being pre-tensioned toward the guide rail, said rail treating unit being captively disposed in the treating unit carrier, said treating unit carrier being preassembled and comprising two carrier parts which bear on each other like a sandwich; said guide means being disposed in the region of contact surfaces of the sandwiched carrier parts, said at least one rail treating unit and pre-tensioning means associated thereto being after insertion in partial guide means of one carrier part secured against separation from the treating unit carrier by juxtaposition of the contact surfaces of both carrier parts and by fixing the two carrier parts to each other.

74. A pre-assembled treating assembly adapted for being mounted on a guide carriage of a linear guide unit, said linear guide unit comprising a guide rail with an axis and at least one guide carriage guided on the guide rail, said pre-assembled treating assembly comprising a treating unit carrier, at least one rail treating unit guided on this treating unit carrier and pre-tensioning means for pre-tensioning the rail treating unit toward the guide rail, said pre-assembled treating assembly further comprising releasable means which maintain the rail treating unit in an inoperative position against the action of the pre-tensioning means.

* * * * *

UNITED STATES PATENT AND TRADEMARK OFFICE
CERTIFICATE OF CORRECTION

PATENT NO. : 5,547,285
DATED : August 20, 1996
INVENTOR(S) : Bernhard Hutzel, Günter Blaurock and Michael Klein It is certified that error appears in the above-indentified patent and that said Letters Patent is hereby corrected as shown below:

Title page:
Item [56], insert the following:
```
      Under the category of U.S.PATENT DOCUMENTS:
      --  509,864    12/1893    M. Booth
        3,168,355    1/1965     L. E. Rudolph
        5,149,205    9/1992     T. Tsukada        384/15--;
      Under the category of FOREIGN PATENT DOCUMENTS:
      --4141038      6/1993     Germany
        1294111      4/1969     Germany
        2822248      12/1979    Germany
        9011073      11/1990    Germany
        9212144      12/2992    Germany --;
Col. 2, line 25, "respect" should read --in respect--;
Col. 6, line 10, "is principle" should read --this principle--;
Col. 10, line 12, "rail" should read --rail profile--;
Col. 10, line 30, "the reto" should read --thereto--;
Col. 17, line 24, "su trace" should read --surface--;
Col. 20, line 20, "%o" should read --to--; and
Col. 21, line 64, "topping-up" should read --topping-up unit--.
```

Signed and Sealed this

Seventeenth Day of December, 1996

Attest:

BRUCE LEHMAN

Attesting Officer

Commissioner of Patents and Trademarks